No. 709,450. Patented Sept. 16, 1902.
S. E. WILSON.
APPARATUS FOR TREATING GARBAGE.
(Application filed Apr. 11, 1902.)
(No Model.) 2 Sheets—Sheet 1.

No. 709,450. Patented Sept. 16, 1902.
S. E. WILSON.
APPARATUS FOR TREATING GARBAGE.
(Application filed Apr. 11, 1902.)
(No Model.) 2 Sheets—Sheet 2.

UNITED STATES PATENT OFFICE.

STEPHEN E. WILSON, OF FRENCHLANDING, MICHIGAN.

APPARATUS FOR TREATING GARBAGE.

SPECIFICATION forming part of Letters Patent No. 709,450, dated September 16, 1902.

Original application filed September 8, 1897, Serial No. 650,936. Divided and this application filed April 11, 1902. Serial No. 102,443. (No model.)

*To all whom it may concern:*

Be it known that I, STEPHEN E. WILSON, a citizen of the United States, residing at Frenchlanding, in the county of Wayne and State of Michigan, have invented certain new and useful Improvements in Apparatus for Treating Garbage and the Like, of which the following is a specification.

My present invention pertains to an improved apparatus for treating garbage, distillery-slops, and the like, or any substance containing grease, moisture, or liquid.

The present application is a division of my application, Serial No. 650,936, filed on or about September 8, 1897, said parent application containing claims to the method of treating garbage, distillery-slops, and the like, which method can be carried out by the apparatus set forth in the present application. The method incident to the use of this apparatus is in part similar to that set forth in Letters Patent of the United States granted to me under date of September 8, 1896, and numbered 567,210.

The object of the present invention is to provide an apparatus in which the substances above noted may be more economically treated.

A further object of the invention is the bringing about of a more sanitary condition in the treatment of the various substances, especially those from which noxious gases and vapors result.

It is to be understood that I do not restrict myself to the treatment of any particular material or class of materials nor to the production of any particular ultimate product, as the apparatus may be used to treat various substances, and the resultant products may be numerous and varied. The apparatus and method are, however, especially efficacious where the material to be treated requires cooking and contains grease which it is desired to recover.

Figure 1:
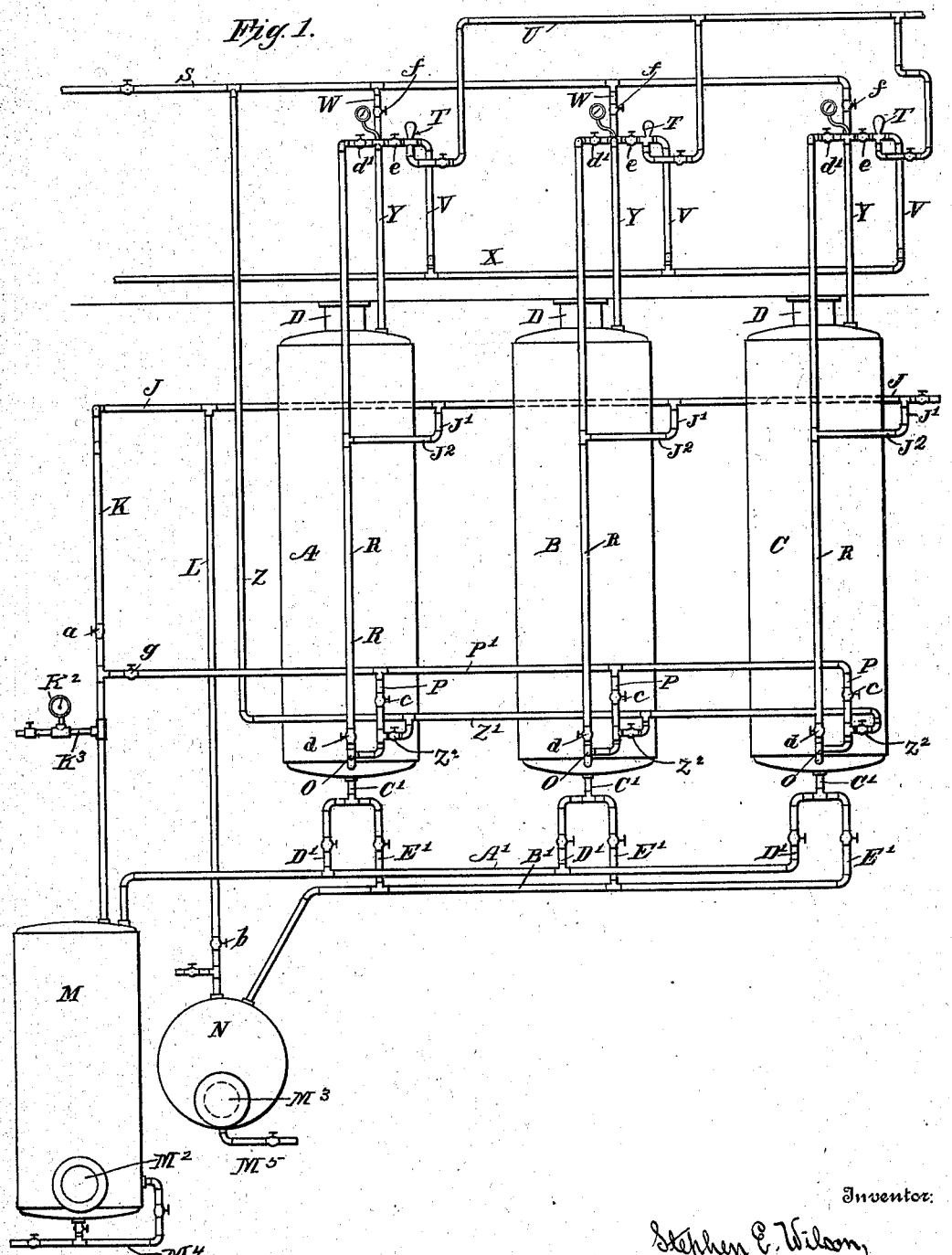
Figure 2:
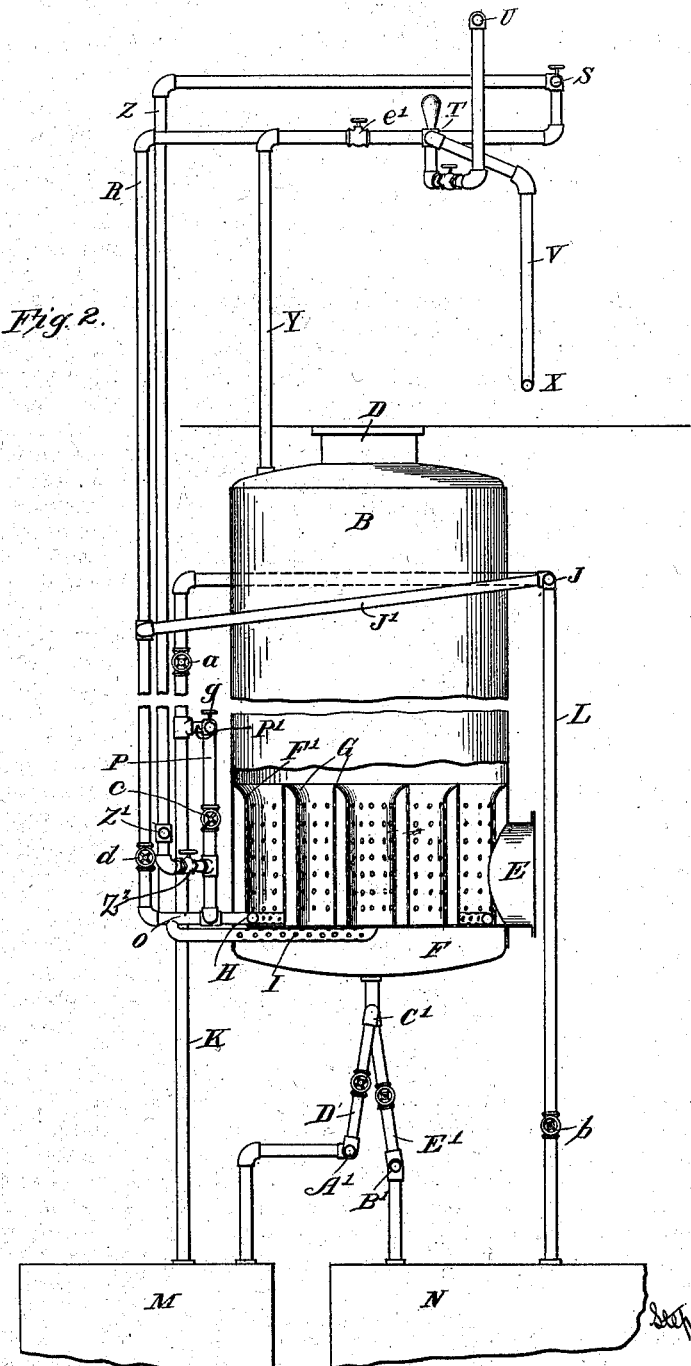

In the accompanying drawings, Figure 1 is a front elevation of my improved apparatus, three combined digesting and compression tanks being shown, though a greater or less number may be employed; Fig. 2, an end elevation, the tanks being shown partly in section.

Referring to said drawings, A, B, and C denote three tanks provided with manholes D for charging the same, and similar openings E, Fig. 2, for withdrawing the product resultant of the process. Said tanks are provided near their lower ends, in line with manhole E, with a perforate bottom or grid F, an annular draining-chamber F', a series of removable hollow perforate draining-chambers G, designed to normally stand on said grid, a perforate coil H, resting, as shown, on the grid, and a perforate pipe I, extending into the tank below the grid.

J denotes the supply-pipe carrying pressure, directly connected through pipes K and L with the low and high pressure tanks M and N, respectively.

Each of the tanks M and N is provided with manholes $M^2$ and $M^3$, and each tank is likewise provided with a draw-off, as $M^4$ and $M^5$, respectively. Pipe K is also provided with a pressure-gage $K^2$, said gage being connected to the pipe by a branch $K^3$.

The high-pressure tank must be placed at a point below the perforate grids of the tanks A, B, and C, so that said tanks may drain thereto; but the relative location of the low-pressure tank M is not so material. Valves $a$ and $b$ are placed in pipes K and L, as shown in Fig. 1.

Coil H is connected to a branch O, from which extends a pipe P, provided with a valve $c$, said pipe P being connected through a suitable lateral branch P' with pipe K. Perforate pipe I is also connected, as shown, with branch O, the end of said branch O being connected to an upright pipe R, provided with valves $d$ and $d'$. Pipe R is in turn connected to supply-pipe J, Fig. 1, through suitable branches, such as J' $J^2$. Said pipe R extends up above the tanks and is connected to pipes Y, extending up from the tanks, as shown, and is also connected to a deodorizer T, a water-supply pipe U connecting with the opposite side of said deodorizer. A pipe V extends from said deodorizers into a waste-pipe X. A connection W is made from pipe Y into a blow-off main S, suitable valves $e$ and $f$ being placed, as shown, to control the passage of the fluid either into the deodorizer or into the blow-off main. The blow-off main is also connected with each of the pipes P, Fig. 1, by a branch Z and main Z'. Suitable valves, as shown, will be employed to control these various pipes, the connections and valves being such that the pressure may be discharged directly into the blow-off or may be made to pass through the deodorizers T.

No particular form of deodorizer is herein shown or described, as any commercial form may be employed. Communication through the branch extending from pipe Z' to the branch O is controlled through valves $Z^2$.

Mains A' and B' extend below the tanks A, B, and C, the former being connected to the low-pressure tank M and the latter to the high-pressure tank N. Each of the tanks A, B, and C is provided with a draw-off pipe C' at its lower end, said pipes C' communicating with mains A' and B' through suitable valved connections D', E', Figs. 1 and 2.

The arrangement of pipes and connections as above set forth has been found to work advantageously; but any other arrangement which will permit of the operation of the apparatus about to be set forth will suffice, and I do not desire to limit myself to the construction illustrated.

The operation of the apparatus is as follows, assuming that the matter under treatment is ordinary city garbage and it is desired to dry the same and recover any grease which may be contained therein: In the practical operation of the apparatus in the treatment of garbage I find steam to give excellent results as the cooking and compressing agent, though hot air or hot vapors such as arise from naphtha may be employed in carrying out the process. For the purpose of explanation it will be presumed that tanks A and B have been fully charged, and the connections are such that the cooking agent, in the present instance steam, will pass from the supply-main J through branches J', $J^2$, pipe R, and branch O into the coils H and perforate pipes I, pipes Y being open to the deodorizers T in order to allow escape of steam, which is desirable when the cooking process is going on. The cooking agent issuing from coils H and perforate pipes I will pass up through the mass and thoroughly cook the same, the length of time required being determined by the nature of the material under treatment. When the matter has been sufficiently cooked, valves $e$ are closed and valves $d'$ opened, allowing pressure to enter into the tops of the tanks A and B from pipe J through pipes Y. Valve $b$ is opened to allow pressure from pipe J to be maintained in tank N. Valves $d$ are then closed, cutting off supply from pipe J to the perforate coils H and pipes I. The valves in branch E' are opened and pressure admitted from tank N through main B' to the bottom of the tanks A and B, thereby establishing equal pressure upon all faces of the charge within said tanks and forcing the liquid therefrom, as fully set forth in my previous patent.

So far the process is similar to that described in my former patent above alluded to; but I have found that after expressing all the liquid possible in this manner the material may be further dried by what I term "penetration" of the material by the pressing agent. To bring about this result, valves in branch E' communicating with tanks A and B are closed, shutting off communication with high-pressure tank N. Valve $a$ in pipe K is manipulated until the desired pressure is secured within the low-pressure tank M, when the branches D' are opened, connecting the bottom of the tanks A and B, through main A', with tank M. Pressure being still maintained in the upper parts of the tanks A and B moisture will be forced from the material through branches D' into the low-pressure tank M, the valve $a$ being so manipulated and regulated as to secure and maintain the proper pressure within said tank M necessary to this result. This is carried on until the fluid under pressure being used penetrates the material in tanks A and B and begins to enter the tank M, which fact will be immediately shown by the pressure-gage used in connection therewith. Valve $a$ is then closed and valves $g$ and $c$ (of tank C) opened, permitting the fluid-pressure to pass through pipe P' into the cooking-coil and perforate pipe I of tank C. The extent to which these valves $g$ and $c$ are opened will be determined by the pressure indicated upon the gage carried by tank M. When the pressure within tank C nearly equals that in tank M, which fact will be indicated by the gages carried by the tanks M and C, respectively, valves $g$ and $c$ are opened wide and valve $e$ of tank C opened. Said valve $e$ will be so manipulated as to allow escape of pressure from the upper part of tank C, maintaining the low pressure within the lower ends of tanks A and B and permitting the fluid-pressure to pass up through the new charge in tank C. When the charge in tanks A and B has been freed as far as possible from moisture or liquid, valves $g$ and $c$ are closed and valve $d$ of tank C opened to permit the cooking agent to pass from main J into the cooking apparatus and complete the cooking operation therein. Valves in branches D' are then closed, as are also the valves $d'$ of each of the tanks A and B, and valves $f$ in pipes W opened into the main S, thus blowing off the tanks A and B preparatory to withdrawing the charge therefrom. The pressure may be discharged directly out of the blow-off main S or may through suitable connections be carried into the cooking apparatus of a fourth tank, or, if preferred, valves $f$ may remain closed and by opening valves $e$ the pressure be discharged through the deodorizers.

It will be found impracticable to force the steam or other fluid directly down through the material, for the reason that the contained water will act as a piston and cake the material upon the grid, according to the amount of water present.

By the method above set forth of first subjecting the mass to pressure upon all sides and pressing and finally penetrating it from one surface to the other this objection is eliminated and a relatively dry mass obtained.

From actual operation of the apparatus as above set forth it is found that the mass which is left in the tanks after the process is finished is quite dry and free from grease. The process carried out in the apparatus as set forth is odorless and is therefore not objectionable, as is the case with the methods now in vogue.

While I have shown only three digesting and compression tanks, it is to be understood that I do not desire to limit myself thereto, as the method may be carried out with economy with a greater or less number of tanks, according to the quality of material to be treated, some of the tanks being used for compression or extraction of the liquid, while others are used to cook the material. Each tank, as shown, will be provided with a gage, so that the operator may know exactly with what pressure he is working.

While I have for the purpose of explanation taken garbage as the matter under treatment, I do not desire to confine myself to the treatment of that matter, as other substances may be treated to advantage in the manner above set forth. So, too, fluid other than steam may be employed, and while I have referred to tank M as a "low-pressure" tank the term is employed simply in its relative sense.

If found desirable, low-pressure tank M may be dispensed with and tank N used both as a high and a low pressure tank, the pressure therein being varied according as one or another step of the process is being carried out.

In the cooking-tanks during the operation of both cooking and pressing the work can be accomplished with almost any degree of pressure. Given a long time, steam at five or ten pounds pressure would cook a charge. A charge could also be cooked just so much quicker with steam at one hundred and fifty pounds pressure, providing the apparatus was so constructed as to withstand the strain. In practical use, however, I have obtained the best results with about eighty pounds steam-supply pressure.

The pressure carried in the high-pressure tank N is of course equal to that being used in the apparatus, while the pressure in tank M, or the low-pressure tank, will be below the working pressure and may run down to a few pounds to the square inch. The degree of pressure maintained in these tanks will of course vary with the pressure used in the apparatus and also according to the material under treatment.

Having thus described my invention, what I claim is—

1. In an apparatus for treating garbage and like material, the combination of a series of digesting-tanks; a fluid-supply connected thereto; a high-pressure tank connected with said fluid-supply and with the series of digesting-tanks; a low-pressure tank; connections between said low-pressure tank and the draw-off of said digesting-tanks; and connections between said low-pressure tank and the cooking apparatus of said digesting-tanks.

2. In an apparatus for treating garbage and the like; the combination of a series of digesting and compression tanks; a fluid-pressure-supply pipe connected thereto with the cooking apparatus thereof and with the top of said tanks; a high-pressure tank connected with the fluid-supply and with the draw-off of said digesting-tanks; a low-pressure tank connected with the draw-off of said digesting-tanks; a blow-off main; and connections between said blow-off main and the cooking apparatus of the digesting-tanks, substantially as and for the purpose described.

3. In an apparatus for treating garbage and like material, the combination of a series of digesting and compression tanks; a fluid-pressure-supply pipe; connections between said pipe and the cooking apparatus of the tanks and the upper ends of the tanks; a high-pressure tank connected with the fluid-pressure supply and the draw-off of the digesting-tanks; a low-pressure tank connected to the draw-off of the digesting-tanks and also with the fluid-pressure supply; a blow-off main; connections between said blow-off main and the low-pressure tank; a deodorizer intermediate the blow-off main and the connections from the low-pressure tank; and a water-supply for said deodorizer.

4. In an apparatus for treating garbage and the like, the combination of a series of digesting-tanks; cooking apparatus for said tanks; a low-pressure tank connected to said digesting-tanks; and connections between said low-pressure tank and said cooking apparatus, substantially as described, whereby the cooking agent may be passed from said low-pressure tank into the cooking apparatus of the digesting-tanks.

In testimony whereof I have signed my name to this specification in the presence of two subscribing witnesses.

STEPHEN E. WILSON.

Witnesses:
HIRAM SPEAR,
FRANK H. CLARK.